A. H. JESSUP.
STERILIZER.
APPLICATION FILED JULY 5, 1917.

1,331,468.

Patented Feb. 17, 1920.
3 SHEETS—SHEET 1.

WITNESSES:
George L. Powell

INVENTOR
Albert H. Jessup
BY
his ATTORNEYS

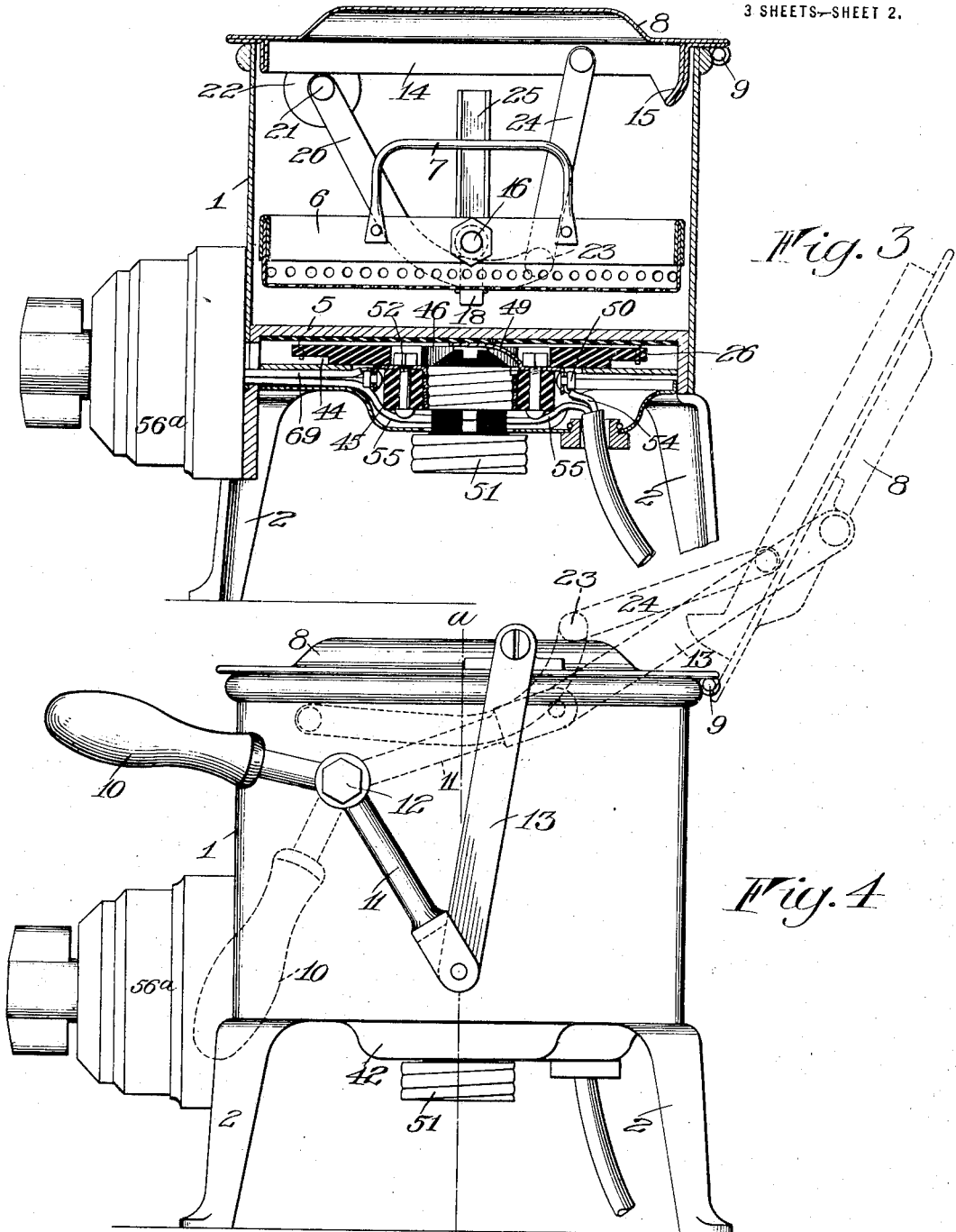

A. H. JESSUP.
STERILIZER.
APPLICATION FILED JULY 5, 1917.
1,331,468.
Patented Feb. 17, 1920.
3 SHEETS—SHEET 3.
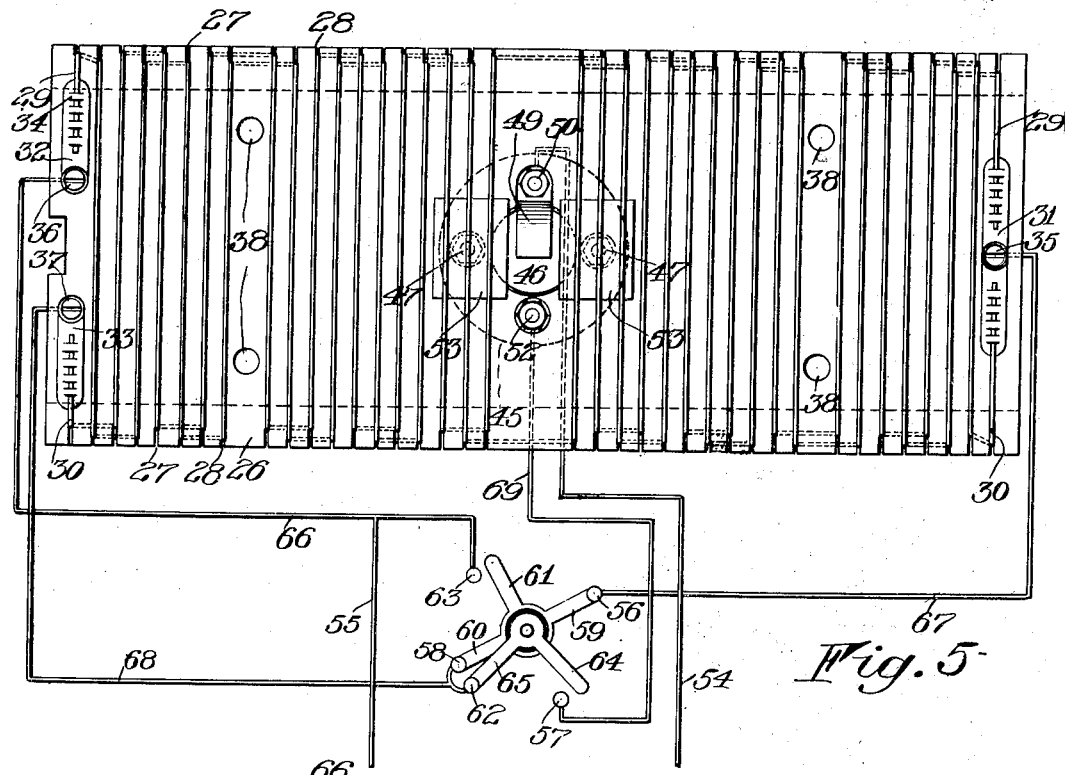
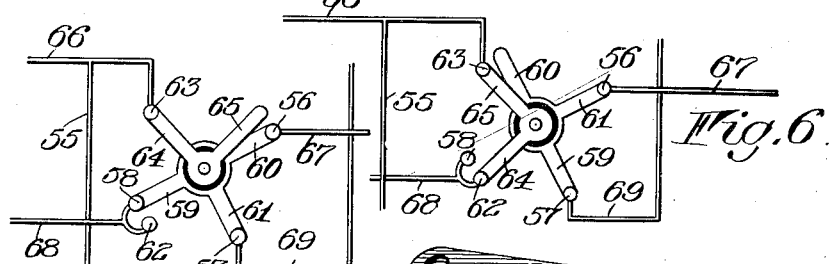
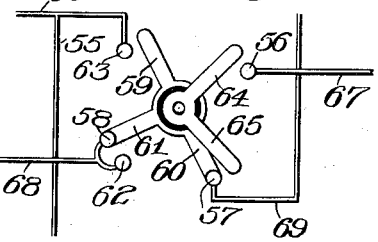
WITNESSES:
George W Powell
INVENTOR
Albert H. Jessup
BY
his ATTORNEYS

UNITED STATES PATENT OFFICE.

ALBERT H. JESSUP, OF ERIE, PENNSYLVANIA, ASSIGNOR TO AMERICAN STERILIZER COMPANY, OF ERIE, PENNSYLVANIA, A CORPORATION OF PENNSYLVANIA.

STERILIZER.

1,331,468.      Specification of Letters Patent.      Patented Feb. 17, 1920.

Application filed July 5, 1917. Serial No. 178,535.

*To all whom it may concern:*

Be it known that I, ALBERT H. JESSUP, of the city of Erie, county of Erie, and State of Pennsylvania, have invented certain new and useful Improvements in Sterilizers; and I do hereby declare the following to be a full, clear, and exact description of the same, reference being had to the accompanying drawings, forming a part of this specification, and to the reference characters marked thereon.

My invention relates to sterilizers and has for its object to provide an apparatus for use in the sterilization of surgical and other instruments in which the sterilizing medium is electrically heated. A further object of the invention is to provide a sterilizer having a cover and an instrument holder, both of which are arranged to be elevated and lowered automatically by the use of a single operating member. A further object of the invention is to provide means for varying the heating capacity of the sterilizer so that relatively high and low temperatures may be maintained therein. To these and other ends the invention consists in certain improvements and combinations of parts, all as will be hereinafter more fully described, the novel features being pointed out in the claims at the end of the specification.

In the drawings:

Fig. 3 is an enlarged transverse sectional view taken on line *b—b* of Fig. 1;

Fig. 4 is an end elevation illustrating the extreme positions of the cover and tray operating mechanism;

Fig. 5 is a wiring diagram of the heater coils indicating the switch control for the same;

Figs. 6 to 8 inclusive are views showing the switch in different closed positions;

Fig. 9 is a detail view of one of the resistor leads, and

Figure 10:
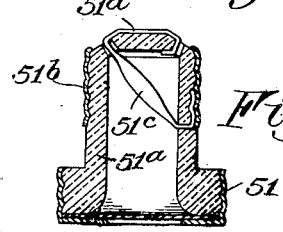

Fig. 10 is a detail view of the fuse plug.

Similar reference characters throughout the several views indicate the same parts.

The present invention comprises a sterilizer of the portable type arranged to be electrically heated and is adapted particularly for use in sterilizing surgical and other small instruments. The invention comprises an oven or receptacle for holding the sterilizing medium such as water, in which the instruments are placed upon a perforated tray or holder normally resting near the bottom of the receptacle, beneath which the electrical heating element is placed, the tray and receptacle cover both being raised and lowered by the same operating member.

In the construction shown in the present embodiment, 1 represents a receptacle mounted upon suitable legs or supports 2. Located at one end of the receptacle is a drain cock 3 connected with an outlet 4 in the bottom 5 of said receptacle, by means of which the liquid or sterilizing medium is drawn off when desired.

Figure 2:
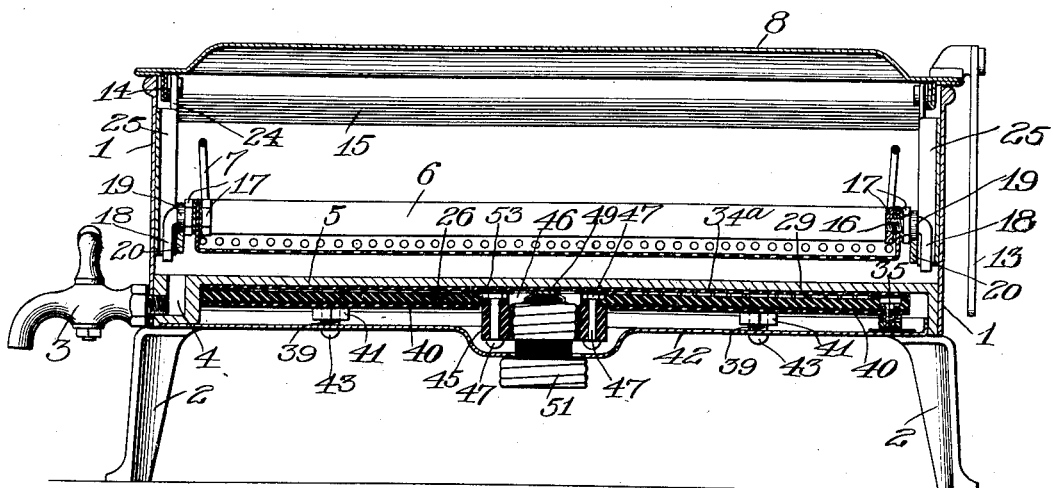
Fig. 2 is a longitudinal section taken on line *a—a* of Fig. 4.

Within the receptacle is an instrument tray or holder 6 provided with perforations in its bottom and sides, as indicated in Figs. 2 and 3. The ends of the tray are provided with handles 7 by which it may be conveniently moved from place to place.

Figure 1:
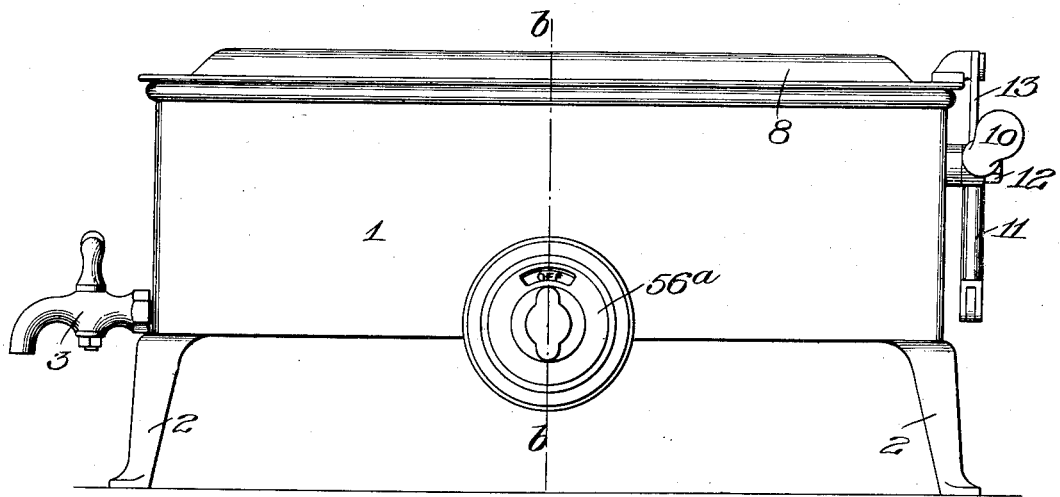
Figure 1 is a front elevation of a sterilizer constructed in accordance with my invention.

The cover 8 of the receptacle is hinged at 9 and is arranged to be opened and closed by raising or lowering the handle 10 of the bell crank 11, pivoted at 12, and operatively connected with the cover by means of the link 13, as shown in Figs. 1 and 4. The cover is provided with a downwardly extending flange 14 projecting into the receptacle, which is inclined inwardly at the back to form a lip, as indicated at 15 in Fig. 3, whereby when the cover is elevated, as indicated by dotted lines in Fig. 4, means is provided to prevent the moisture accumulating upon the inner surface of the cover from escaping and running down the outer wall of the receptacle.

Through the ends of the tray and centrally thereof are positioned the bolts 16 provided with lock nuts 17 on the opposite sides of the tray as shown in Fig. 2. The heads of the bolts comprise downwardly extending portions 18 which project a slight distance below the bottom of the tray to form supports for the same when said tray is removed from the receptacle and placed upon a table, whereby the bottom of the tray is held above the table. Rollers 19 are placed upon the horizontally disposed portions of the bolts adjacent the outer locking nuts and beneath the rollers are extended the curved arms 20, as shown in Fig. 3. The upper ends of the arms are pivoted at 21, each upon a circular boss or projection 22 on the inner end walls of the receptacle, while the lower ends of the arms are pivotally connected at 23 with the rods 24, the upper ends of which are pivoted upon the flanges 14 of the cover 8, as shown in Fig. 3. Guides 25 are positioned upon the end walls of the receptacle to receive the heads 18 of the bolts 16 to prevent tipping of the tray as it is moved up and down within the receptacle. It will be seen from this construction that movement of the cover 8 from the position shown in Fig. 3 to that shown by dotted lines in Fig. 4, is effected by pressing down upon the handle 10, thereby causing the rod 24 and arm 20 to lift the tray to the top of the receptacle from whence it may be removed by means of the handles 7, the guides 25 serving to retain the tray in a horizontal position as long as the latter remains within the receptacle. The tray or instrument holder may be readily replaced in the receptacle by inserting the downwardly extending heads of the bolts 16 within the guides 25 and lowering the tray until the rollers 19 come in contact with the arms 20. Thus it will be seen that movement of the handle 10 will effect simultaneous movement of the cover and tray regardless of the direction in which the handle is moved.

The electric heater comprises a grid 26 formed of suitable insulating material and provided on its opposite edges, as shown in Fig. 5, with two sets of notches 27 and 28, the former being cut relatively deeper than the latter. The deeper notches on each side of the grid are arranged to lie directly opposite those of less depth on the other side of the grid, or in other words, the notches on either side are alternately arranged as regards to depth. Wound upon the grid within the notches are two separate resistance coils 29 and 30, each having one of its ends connected with a single resistor lead 31, the opposite end of the coil 29 being connected with a resistor lead 32 and that of the coil 30 with an independent resistor lead 33. The coils are preferably composed of high resistance ribbon material such as "nichrome." The leads 31 to 33 inclusive, are constructed of thin strips of metal provided with transverse cuts in order that sections of the strip may be displaced laterally as indicated at 34 in Fig. 9, so that the ends of the ribbon resistance material may be inserted between the displaced sections and body of the strip, after which the sections are hammered or pressed down to engage and lock the ends of the resistance coils as indicated in Fig. 5.

The coils traverse the grid only on one side so that practically all of the resistance is in contact with the sheet of mica or other insulating material 34$^a$ on the bottom 5 of the receptacle. This is made possible by the particular arrangement of slots in the grid, which permits the coils in the slots 27 to be passed beneath the grid at the sides thereof without contacting with the coils in the slots 28.

The strip or lead 31 is secured to the upper side of the grid by the centrally disposed binding post 35, while the leads 32 and 33 are secured to the opposite end of the grid by the binding posts 36 and 37. The grid is provided with holes 38 through which extend the externally threaded studs 39 projecting downwardly from the bottom 5 of the receptacle. The studs also project through the cap plate 40 on the bottom of the grid which is held in place by the nuts 41, as indicated in Fig. 2. By screwing the nuts up tight against the cap plate the coils upon the grid are brought into intimate contact, under pressure, with the insulating mica plate 34$^a$, which imparts the heat of the coils uniformly from its entire area to the heavy cast bottom of the oven, thus insuring more perfect radiation of the heat supplied by the coils through said bottom than would otherwise be obtained. A false bottom 42 is secured upon the studs 39 by means of the screws 43 which are threaded into the studs, the bottom 42 being held in spaced relation to the cap plate 40 as shown. The grid is recessed at 44 to prevent the cap plate 40 from coming in contact with the heating coils on the lower side of the grid. A ferrule 45 is secured beneath the opening 46 in the grid by means of the bolts 47 as shown in Figs. 2 and 5, and a contact finger 49 having a binding post 50 is connected with the ferrule with which a binding post 52 also is connected, as shown in Figs. 3 and 5. The bolts 47 which secure the ferrule to the grid are insulated from the coils on top of the grid by the strips 53 which are preferably formed of mica.

One side of the line, or circuit is connected with the binding post 50 through the conductor 54, while the other side is connected with the coil 29 through the binding post 36 and conductors 55, 56. A switch 56$^a$ is mounted on the front of the receptacle for controlling the supply of current to one or both of the resistance coils to provide the maximum, minimum, or intermediate heat or to discontinue the current to both coils. In circuit with the latter is a fuse carried by the removable plug 51, which will be further described.

The switch comprises the contacts 56, 57 and 58 arranged to be engaged by the movable switch arms or brushes 59, 60 and 61 and the contacts 62 and 63 arranged to be engaged by the movable switch arms 64 and 65 which are insulated from the arms 59, 60 and 61. One end of the resistance coil 29 is connected with the contact 63 and also with the main line conductor 55 through the wire 66, while the opposite end of said coil is connected with the contact 56 through the wire 67. One end of the coil 30 is also connected with the contact 56 through the wire 67, the latter having one end connected to the lead 31 to which the coil 29 is connected. The contacts 58 and 62 are both connected with the other end of the coil 30 by means of the wire 68, while the contact 57 is connected with the binding post 52 by means of the wire 69.

The switch in Fig. 5 is shown in open position. When the brushes 64 and 65 are moved into engagement with the contacts 62 and 63 respectively, as shown in Fig. 6, brush 59 will engage contact 57 and brush 61 will engage contact 56, at which time the two coils or windings will be connected in parallel and the resistance brought to its maximum heating capacity. With the switch in this position current will flow through main line conductor 54, fuse 51, wire 69, brushes 59 and 61, wire 67, coils 29 and 30, wires 66 and 68 through brushes 65 and 64 respectively, and thence through main line conductor 55. The next succeeding position of the switch is indicated in Fig. 7, in which only the coil 29 is in circuit. With the switch in this position the capacity of the heater is reduced to an intermediate point between "high" and "low" in which current passes through wire 69, brushes 61 and 60, wire 67, coil 29, wire 66 and thence through conductor 55. The next succeeding position of the switch is indicated in Fig. 8, in which position the minimum capacity of the heater is reached. In this case the coils are connected in series and current will flow through main line conductor 54, wire 69, brushes 60 and 61, wire 68, coil 30, lead 31, coil 29, wire 66 and thence through main line conductor 55. With the coils connected in series the heater is capable of bringing water to the boiling point within the receptacle, although in this position the coils are reduced to their minimum heating capacity.

The particular manner of winding and overlapping the coils upon the grid as shown in Fig. 5, affords an even distribution of heat over the entire bottom of the oven regardless of whether or not the coils are in series or in parallel, or whether only one of said coils is in circuit. The object in this case is to provide a plurality of coils or windings extending over a given area in such a manner that regardless of whether or not one or more of the coils is in circuit, the radiation therefrom will be evenly distributed over the entire surface which the coils are intended to heat.

It will be observed that the electric resistance heating strips are woven across the upper face of the support, so that practically the entire radiating surface of each strip is used, thus avoiding the loss in energy which occurs where the resistance elements are wound helically around their supports, whereby more than one-half of their length is out of contact with the surface to be heated. Another point to which attention is directed is the fact that the convolutions of the two strips alternate from end to end of the support, thus causing an even distribution of the heat when one coil alone is utilized. In other words, where a plurality of coils is employed the convolutions of each are so disposed that all of the coils cover, or are spread over, the same given area, the intent and purpose being to heat the bottom of the sterilizer equally at all points, as this insures a quicker heating of the water, or other sterilizing medium which may be placed in the receptacle and maintains it at the desired temperature with the minimum amount of current consumption.

The fuse contained in the plug 51 is adapted to perform the dual functions of protecting the resistor, or electric heating element against an overload of current and also to protect the sterilizer against becoming over heated by the evaporation of the liquid therein. In order to adapt it to the performance of both of these functions the plug is so constructed that the fuse has an exposed portion and is mounted on the support, or grid, to hold this part of the fuse in juxtaposition to the bottom of the sterilizer, or in contact therewith, whereby it will, at all times, be heated by conduction to approximately the same degree of temperature to which the receptacle is heated. A convenient arrangement of the parts by which this object is obtained is illustrated particularly in Figs. 3 and 10, the latter being a detail cross-sectional view of the fuse plug comprising the insulating portion $51^a$, threaded at its inner end and carrying the contact collar $51^b$, which engages in a sleeve attached to the binding post 52, and mounted within the ring, or ferrule, 45. The latter surrounds the aperture 46 in the support 26, through which the top, or inner end, of the plug $51^a$ projects. The latter carries the fuse link $51^c$ having the exposed portion $51^d$, which contacts with the finger 49, through which the circuit is completed. When the fuse plug is screwed into position the end $51^d$ of the fusible link is compressed against the finger 49 and the latter is forced against the bottom 5 of the receptacle so that the heat imparted to the latter is conducted into the fuse $51^c$, which will be melted, and thus open the circuit leading to the resistor whenever the predetermined temperature in the receptacle has been reached. This is considered a very advantageous feature in an instrument of this character as it not infrequently happens that a doctor and his assistants, when performing an operation, will overlook the fact that the water in the sterilizer has evaporated. On other occasions, thoughtlessness on the part of the assistant may result in damaging the apparatus, by allowing it to become overheated, a condition which is more liable to occur with an electrically heated instrument than with one heated by a gas flame, the condition of which may be observed.

I claim as my invention:

1. In a sterilizer, the combination with a receptacle comprising side walls and a bottom of cast metal relatively heavier than the side walls having depending edge flanges and bolts extending downwardly from the bottom, of a plate of insulating material held by said bolts against the under surface of the bottom and an electric resistance heating strip woven across the face of the plate and held in contact with the bottom of the receptacle by the plate.

2. In a sterilizer, the combination with a receptacle having a bottom, an underlying plate of insulating material secured thereto, and an electric resistance heating strip on the plate, of terminals on the plate for a leading-in circuit conductor, a support on the plate for a fuse plug, by means of which said terminals may be electrically connected and circuit connections comprising a switch extending between one of the terminals and one end of the resistance strip.

3. In a sterilizer, the combination with a receptacle having an inset bottom, an insulating plate underlying the bottom and an electric resistance heating strip on the plate, of terminals on the latter for a leading-in circuit conductor, a support on the underside of the plate for a fuse plug, by means of which the terminals may be connected in circuit and a cover plate extending across the bottom and inclosing the insulating plate and provided with an aperture for the insertion and removal of the plug from its support.

4. In a sterilizer, the combination with the walls of a receptacle and an electric resistance element arranged to heat one of the walls, of a fusible link in circuit with said resistance arranged adjacent the wall of the receptacle to be heated thereby and adapted to open the circuit when said wall is heated to a predetermined degree of temperature.

5. In a sterilizer, the combination with a receptacle having a bottom, and an electric heating element arranged beneath the bottom, of a fuse in circuit with the heating element and means for holding the fuse in position to be heated to substantially the same temperature as the bottom of the receptacle.

6. In a sterilizer, the combination with the walls of a receptacle, an electric resistance heating element, and a support therefor arranged to hold it in juxtaposition to the wall to be heated, of a fuse plug having a fuse arranged in the circuit of the heating element, a portion of which is exposed on the exterior of the plug and means for detachably mounting the plug on the support with the exposed portion of said fuse adjacent the wall to be heated.

7. In a sterilizer, the combination with a receptacle having a bottom, an electric resistance heating element, a support therefor arranged to hold it in contact with the bottom and provided with an aperture and a screw collar surrounding the latter, of a threaded fuse plug fitting the collar having a fusible link arranged in the circuit of the heating element a portion of said fuse being exposed on the inner end of the plug and adapted to contact with the bottom of the receptacle.

8. In a sterilizer, the combination of a receptacle, a cover therefor, a tray therein, guides mounted in the receptacle, projections carried by the tray arranged to travel in the guides, arms pivoted to the receptacle and arranged to engage the projections, and links connecting the cover and arms and adapted to raise the tray when the cover is opened.

9. In a sterilizer, the combination of a receptacle, a cover therefor, a tray supported within the receptacle, guides mounted in the receptacle, projections carried by the tray and engaging said guides, arms pivoted to the inner walls of the receptacle, and extending beneath the projections, links connecting the cover and the arms, and a lever pivoted to the exterior of the receptacle and adapted to raise and lower the cover.

10. In a sterilizer, the combination of a receptacle, a cover pivoted thereon, a vertically movable tray in the receptacle, means operated by the cover for moving the tray, means for guiding the tray in an upright position during movement, a lever pivoted on the outer wall of the receptacle, and a link connecting the lever to the cover for raising and lowering the same.

11. In a sterilizer, the combination of a receptacle, a cover therefor, a tray therein, guides vertically arranged on the inner walls of the receptacle, vertically extending projections on the tray adapted to engage the guides, and means engaging the projections and operatively connected with the cover whereby movement of the latter will effect movement of the tray.

12. In a sterilizer, the combination of a receptacle, a cover hinged thereon, a flange on the cover adjacent the hinged edge thereof adapted to span the space between the cover and the adjacent edge of the receptacle and serving to retain the water of condensation on the cover when the cover is open, and to extend into the receptacle when the cover is closed, and means for opening and closing the cover.

13. A tray for a sterilizer having projections on its opposite side edges projecting below the plane of the bottom of the tray and adapted to guide the tray when in the sterilizer and support it when removed therefrom.

14. A tray for a sterilizer having vertically extending projections centrally disposed on its ends and projecting below the plane of the bottom of the tray and adapted to guide the tray when in the sterilizer and support it when removed therefrom.

ALBERT H. JESSUP.